(12) United States Patent
Kuykendall

(10) Patent No.: US 7,568,463 B1
(45) Date of Patent: Aug. 4, 2009

(54) MOTORCYCLE ENGINE

(76) Inventor: H. Dale Kuykendall, 1623 School St., Washington, IL (US) 61571

( * ) Notice: Subject to any disclaimer, the term of this patent is extended or adjusted under 35 U.S.C. 154(b) by 494 days.

(21) Appl. No.: 11/584,154

(22) Filed: Oct. 20, 2006

Related U.S. Application Data

(60) Provisional application No. 60/730,784, filed on Oct. 27, 2005.

(51) Int. Cl.
*F01N 1/00* (2006.01)
(52) U.S. Cl. .................................................. 123/193.5
(58) Field of Classification Search .............. 123/193.3, 123/193.5, 54.4; 181/225; 60/272
See application file for complete search history.

(56) References Cited

U.S. PATENT DOCUMENTS 6,026,930 A * 2/2000 Ogisu et al. ................. 181/228
7,374,016 B2 * 5/2008 Yamaguchi et al. ......... 181/249
2003/0079938 A1 * 5/2003 Yamaguchi ................. 181/227

* cited by examiner

*Primary Examiner*—M. McMahon
(74) *Attorney, Agent, or Firm*—Philip L. Bateman

(57) ABSTRACT

A motorcycle having: (i) a V-type two-cylinder engine having a front cylinder and a rear cylinder, each cylinder having a head with a right side exhaust port and external cooling fins; (ii) a right side muffler and a left side muffler; and (iii) a front header running from the exhaust port of the front cylinder head to the right side muffler and a rear header running from the exhaust port of the rear cylinder head to both the right side muffler and the left side muffler; is modified by removing the rear cylinder head and replacing it with a new rear cylinder head having a left side exhaust port and by removing the rear header and replacing it with a new rear header running only to the left side muffler such that all the exhaust gases from the front cylinder flow through the right side muffler and all the exhaust gases from the rear cylinder flow through the left side muffler.

4 Claims, 6 Drawing Sheets

MOTORCYCLE ENGINE

CROSS-REFERENCE TO RELATED APPLICATION

This application claims the benefit of U.S. Provisional Application Ser. No. 60/730,784, Oct. 27, 2005.

FIELD OF THE INVENTION

This invention relates to motorcycles. More particularly, this invention relates to a method of modifying a motorcycle having a V-type two-cylinder engine with an imbalanced dual exhaust system.

BACKGROUND OF THE INVENTION

As shown in FIGS. 1 and 2, many motorcycles contain two-cylinder engines 10 in which the cylinders are arranged in a V-shaped configuration with the front cylinder 20 directly in front of the rear cylinder 30. This type of engine is commonly known as a V-type. V-type motorcycle engines are typically air-cooled. Harley-Davidson, Inc. of Milwaukee, Wis. manufactures and sells a popular line of motorcycles most of which are powered by air-cooled V-type two-cylinder engines. These motorcycles typically contain dual exhaust systems, each of which consists of two major parts—a header pipe and a muffler. The muffler is located at the end of the exhaust system and typically contains packing or baffles to reduce noise. The exhaust gases flow from the engine, through the headers, and then through the mufflers before being discharged to the atmosphere.

The exhaust ports of both the front and rear cylinder heads in the Harley-Davidson engines are located on the right side. In other words, when viewed from above facing forward, the exhaust ports are located to the right of an imaginary longitudinal line running through the wheels. Some of the models contain dual exhaust systems in which both systems are located on the right side of the motorcycle. Other models, including the Road King, Ultra Classic Electroglide, Softail, and Heritage, contain dual exhaust systems in which one muffler is located on the left side of the motorcycle and one muffler is located on the right side of the motorcycle. The exhaust gases from the front cylinder are easily routed from the exhaust port through a right header 40 to a right muffler 50. However, routing the exhaust gases from rear cylinder is not as straightforward.

Routing all the exhaust gases from the right side of the rear cylinder to a muffler on the left side of the motorcycle would require a lengthy and protruding header making a 180 degree bend. Harley-Davidson avoids such a header by using a rear equalizer header 60. The rear equalizer header carries the exhaust gases from the rear cylinder to both the right muffler and the left muffler 70. Due to the configuration of the equalizer header, most of the exhaust gases from the rear cylinder are conveyed to the right muffler, which already carries all the exhaust gases from the front cylinder. As a result, the right muffler carries a high percentage of the exhaust gases from the engine and the left muffler carries only a low percentage of the gases.

The result is acceptable aesthetically in that the motorcycle contains a right side exhaust system and a left side exhaust system. However, the imbalance in the dual exhaust system is undesirable functionally for three major reasons. First, the back pressure created by the exhaust system is much greater in the rear cylinder than in the front cylinder. Accordingly, the power produced by the two cylinders is not equal. Second, the right exhaust system wears out before the left exhaust system. Third, the sound coming from the dual exhausts is not balanced and alternating.

Accordingly, there is a demand for a method of modifying a motorcycle having a V-type two-cylinder engine and an imbalanced dual exhaust system to create a balanced dual exhaust system.

SUMMARY OF THE INVENTION

The general object of this invention is to provide an improved method of modifying a motorcycle having a V-type two-cylinder engine and an imbalanced dual exhaust system to create a balanced dual exhaust system.

I have invented a method of modifying a motorcycle comprising: (i) a V-type two-cylinder engine having a front cylinder and a rear cylinder, each cylinder having a head with a right side exhaust port and external cooling fins; (ii) a right side muffler and a left side muffler; and (iii) a front header running from the exhaust port of the front cylinder head to the right side muffler and a rear header running from the exhaust port of the rear cylinder head to both the right side muffler and the left side muffler. The method comprises: (a) removing the rear cylinder head and replacing it with a new rear cylinder head having a left side exhaust port; and (b) removing the rear header and replacing it with a new rear header running only to the left side muffler; such that all the exhaust gases from the front cylinder flow through the right side muffler and all the exhaust gases from the rear cylinder flow through the left side muffler.

The method of this invention creates a balanced exhaust system which, in turn, maximizes engine power. It also equalizes wear and provides a pleasing, alternating sound to the exhaust system.

DETAILED DESCRIPTION OF THE INVENTION

This invention is best understood by reference to the drawings. The modification is performed on a motorcycle comprising: (i) a V-type two-cylinder engine having a front cylinder and a rear cylinder, each cylinder having a right side exhaust port and external cooling fins; (ii) a right side muffler and a left side muffler; and (iii) a front header running from the exhaust port of the front cylinder to the right side muffler and a rear header running from the exhaust port of the rear cylinder to both the right side muffler and the left side muffler. As explained in detail above, this type of motorcycle suffers numerous disadvantages due to its imbalanced exhaust system.

Figure 4:
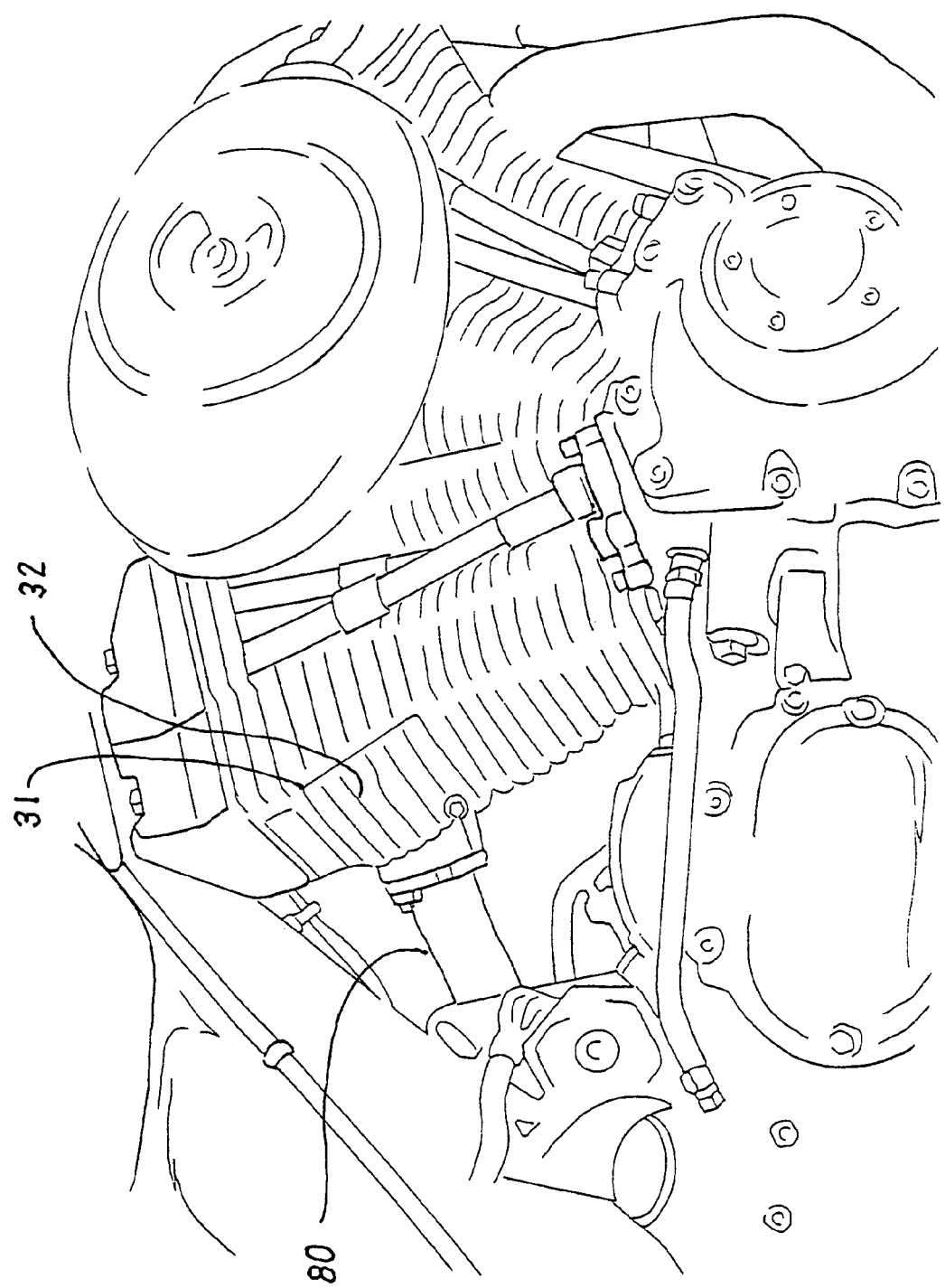
FIG. 4 is a right side detailed view thereof showing the rear cylinder header.

The first step of the modification is to remove the rear cylinder head and replace it with a new rear cylinder head having a left side exhaust port. The new rear cylinder head is obtained in one of two ways. The preferred way of obtaining the new rear cylinder head is to cast or otherwise manufacture it in the same way as the original rear cylinder head. The less preferred, alternative way is to modify the original rear cylinder head by plugging the right side exhaust port and drilling a left side exhaust port. As best seen in FIG. 4, the plug 31 preferably contains cooling fins 32 that blend in shape and appearance with the cooling fins of the head and cylinder. The plug is welded in place. When plugging the original exhaust port, new oil return holes are drilled and reamed. The holes are then preferably lined with brass tubing to prevent oil leaks.

Figure 1:
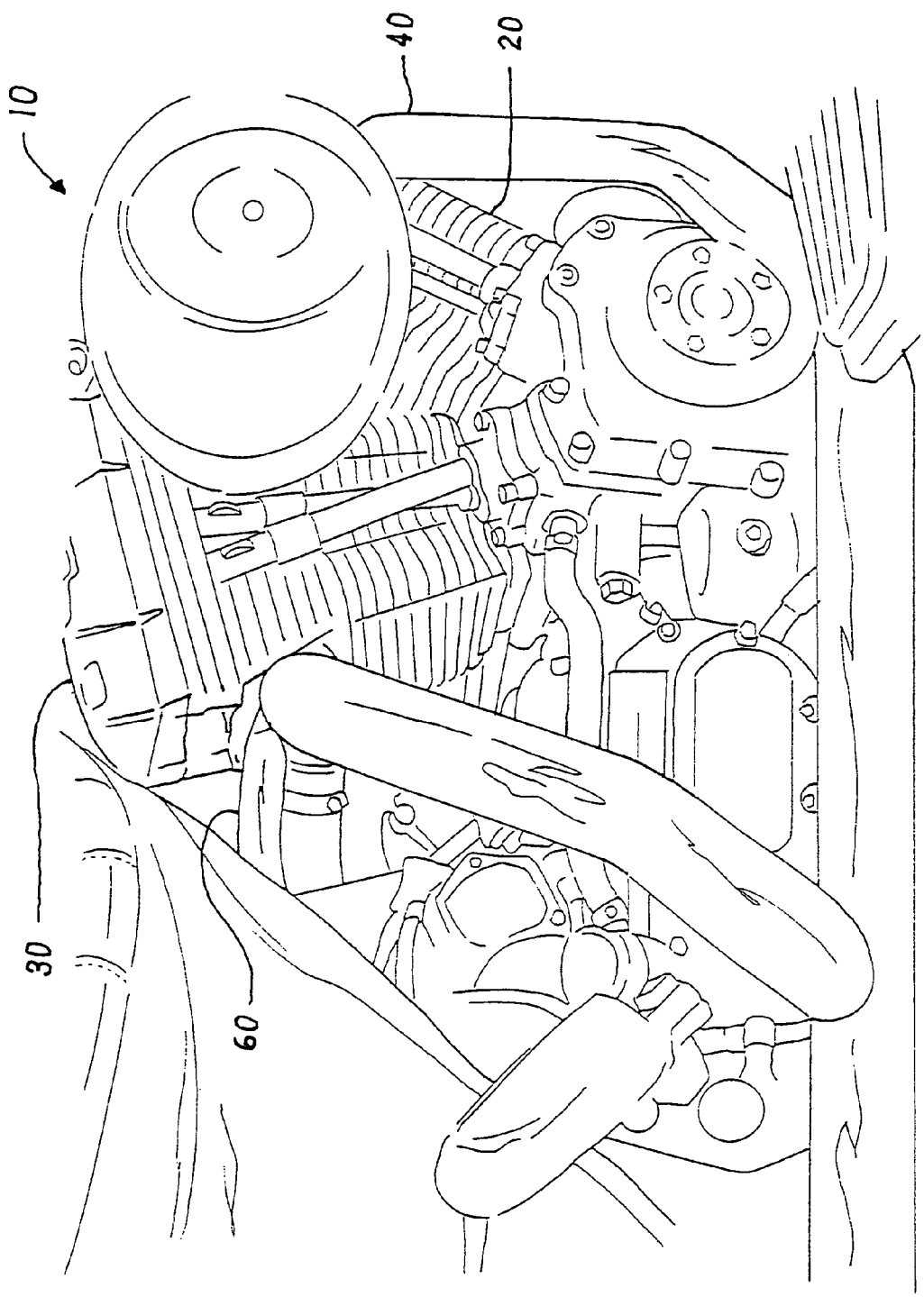
FIG. 1 is a right side perspective view of the engine and a portion of the exhaust system of a prior art motorcycle.
Figure 2:
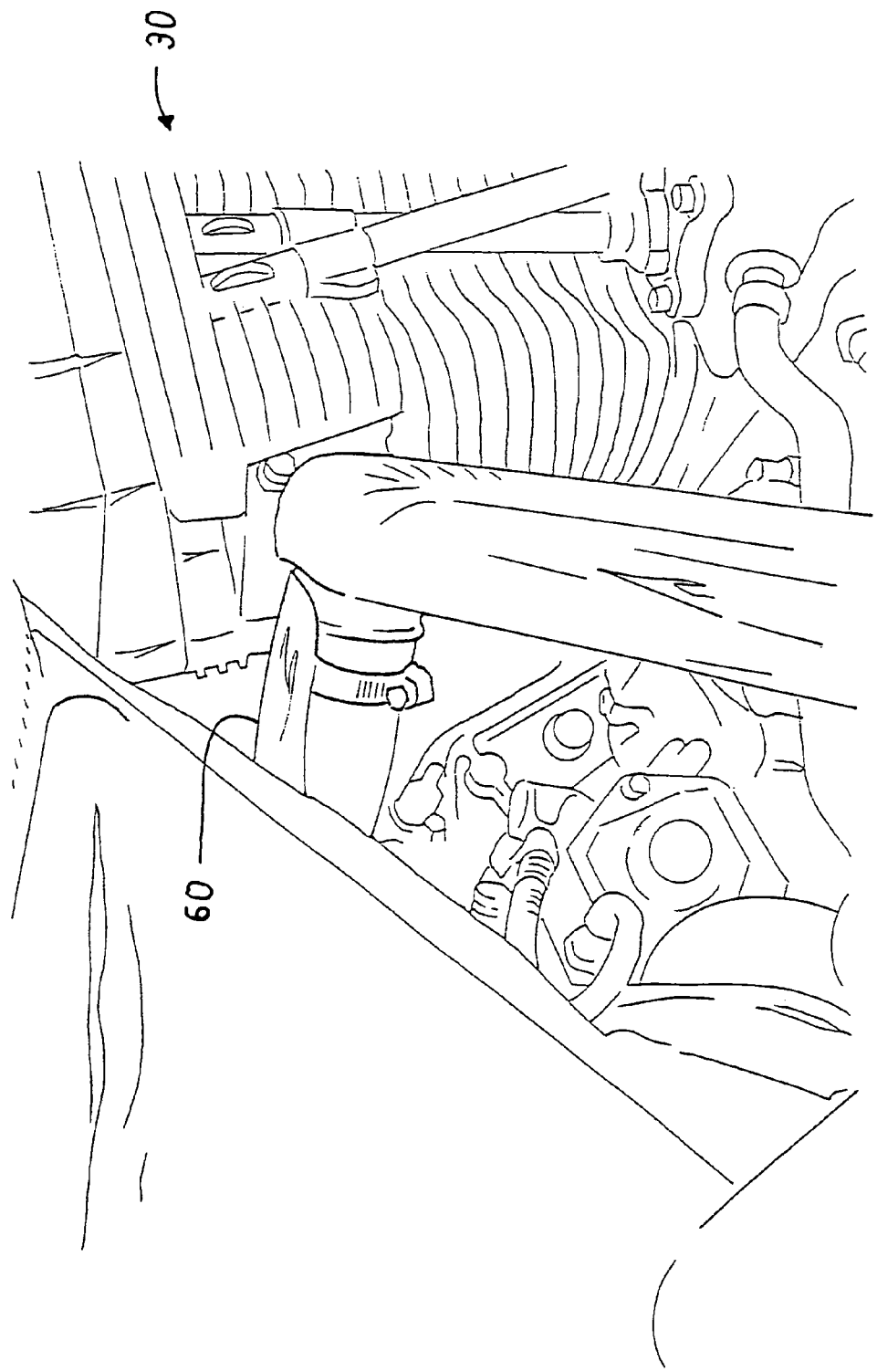
FIG. 2 is a right side detailed view thereof showing the rear cylinder equalizer header.
Figure 3:
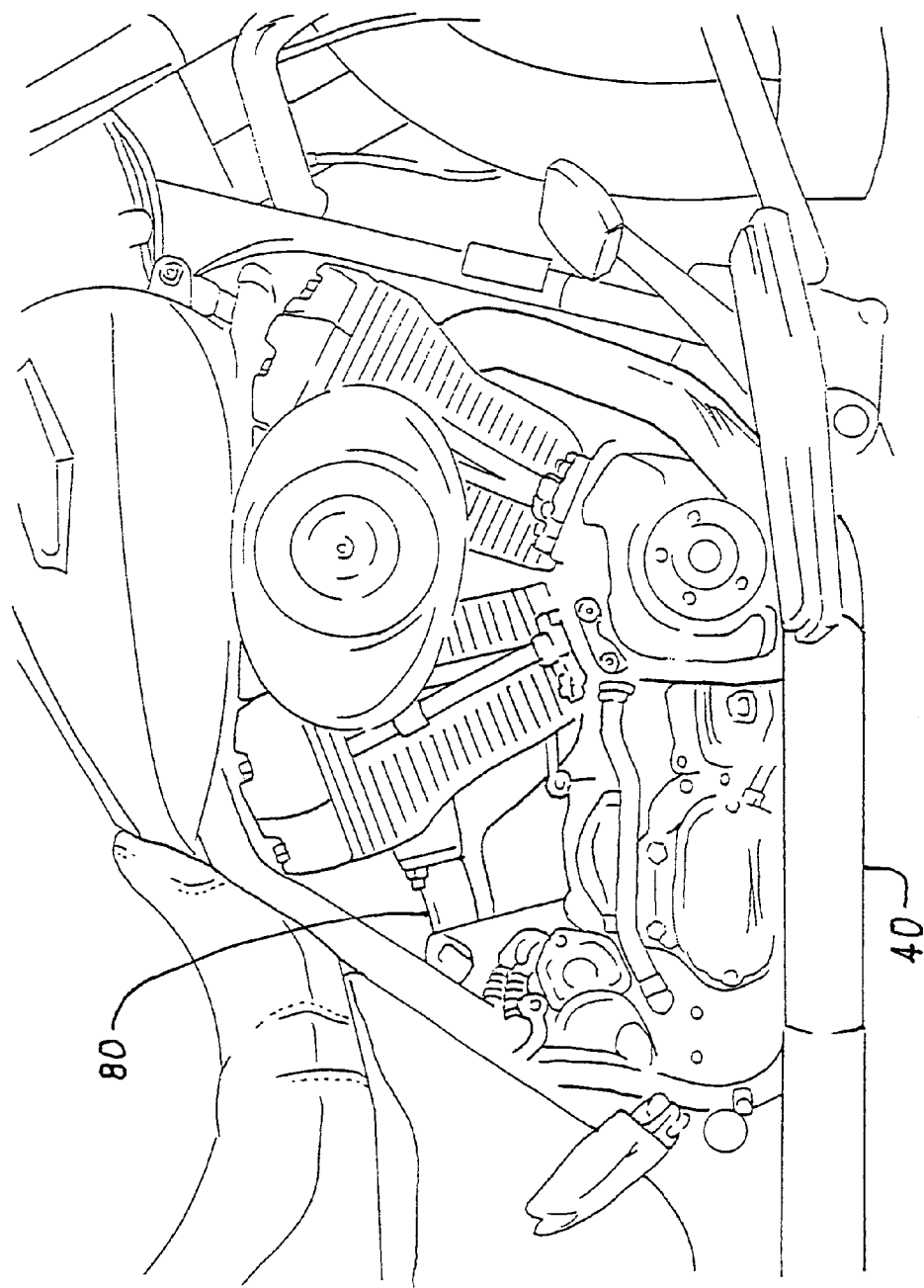
FIG. 3 is a right side elevation view of the engine and a portion of the exhaust system of a motorcycle after being modified by the method of this invention.
Figure 5:
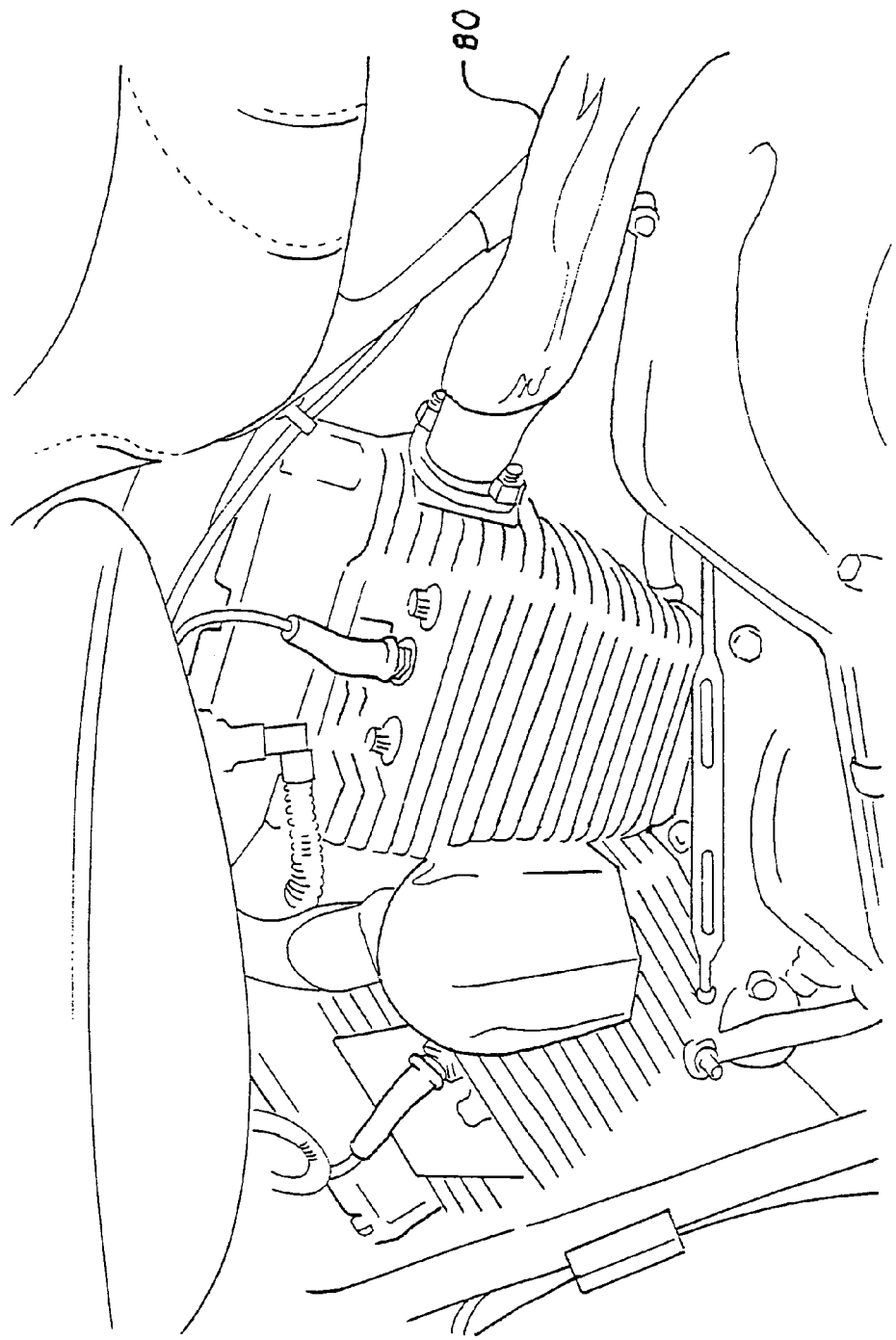
FIG. 5 is a left side detailed view thereof showing the rear cylinder header.
Figures 6, 7:
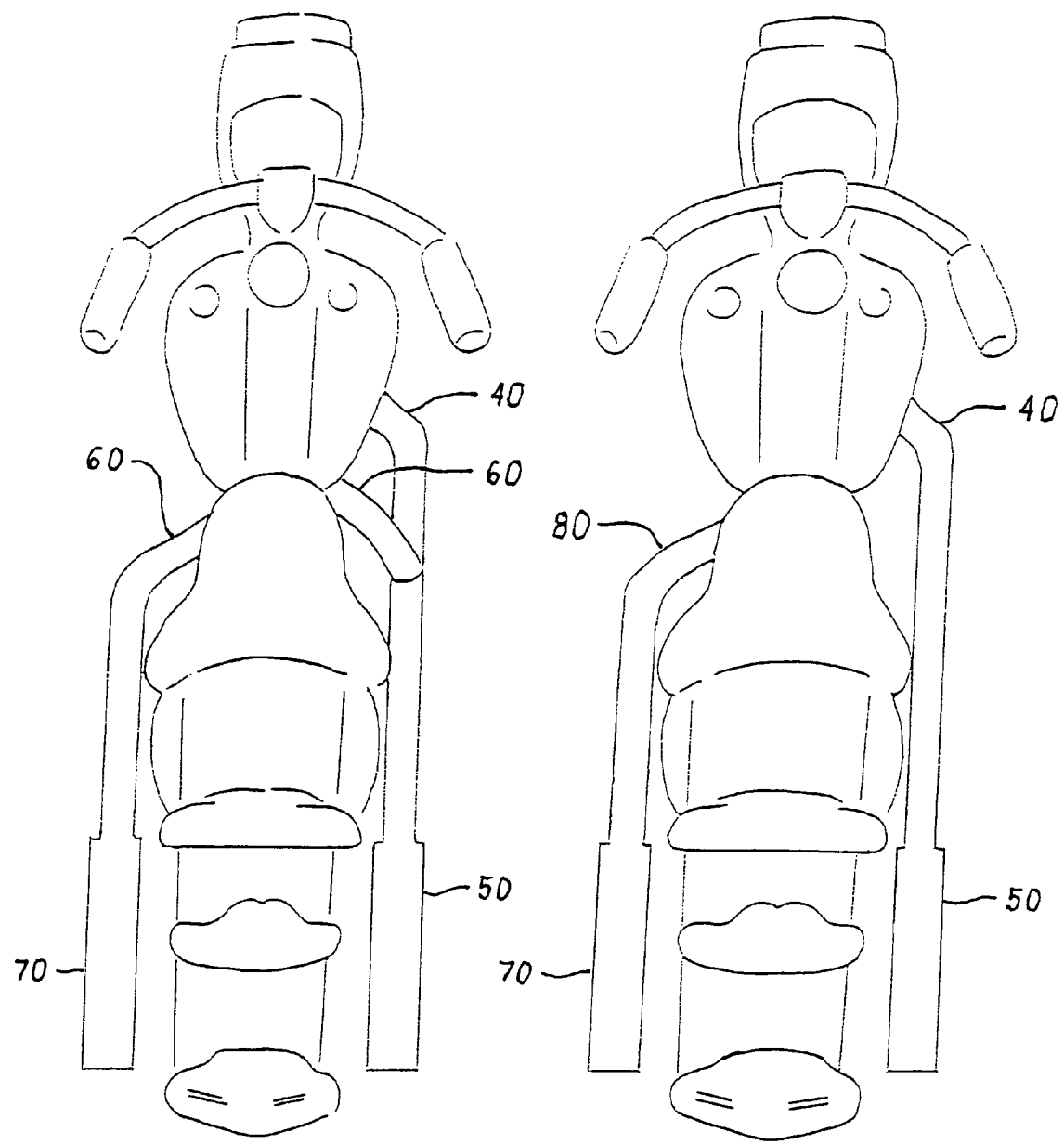
FIG. 6 is a top view of a prior art motorcycle.
FIG. 7 is a top view of a motorcycle after being modified by the method of this invention.

The second step of the modification is to remove the rear equalizer header and replace it with a new header 80 that runs from the new exhaust port on the left side to the muffler on the left side. The new header is preferably sized to optimize the back pressure. The modification is well within the skill of any experienced motorcycle mechanic. The completed modification is illustrated in FIGS. 3, 4, and 5. A top view comparison of a motorcycle before and after the modification is shown in FIGS. 6 and 7.

After the modification is completed, the motorcycle's exhaust system is perfectly balanced. In other words, all the exhaust gases from the front cylinder flow through the right side exhaust system and all the exhaust gases from the rear cylinder flow through the left side exhaust system. The back pressure in the two exhausts is nearly equal so the power produced by the two cylinders is also nearly equal. The two exhaust systems carry the same volume of gases so they wear equally. The sound coming from the dual exhaust systems is especially pleasing because the volume is equal and because the sound alternates between the two sides.

I claim:

1. A method of modifying a motorcycle comprising: (i) a V-type two-cylinder engine having a front cylinder and a rear cylinder, each cylinder having a head with a right side exhaust port and external cooling fins; (ii) a right side muffler and a left side muffler; and (iii) a front header running from the exhaust port of the front cylinder head to the right side muffler and a rear header running from the exhaust port of the rear cylinder head to both the right side muffler and the left side muffler; the method comprising:

(a) removing the rear cylinder head and replacing it with a new rear cylinder head having a left side exhaust port; and (b) removing the rear header and replacing it with a new rear header running only to the left side muffler;

such that all the exhaust gases from the front cylinder flow through the right side muffler and all the exhaust gases from the rear cylinder flow through the left side muffler.

2. The method of claim 1 wherein the new rear cylinder head is created by plugging the right side exhaust port of the original rear cylinder head and drilling a left side exhaust port.

3. The method of claim 2 wherein the plug contains cooling fins that blend with the cooling fins of the cylinder head.

4. The method of claim 1 wherein the new rear cylinder head is cast.

* * * * *